United States Patent

Csik et al.

[11] Patent Number: 6,010,094
[45] Date of Patent: Jan. 4, 2000

[54] GALLERY RETAINER

[75] Inventors: Terrence S. Csik; Dale L. Short, both of Pasadena, Calif.

[73] Assignee: Skylock Industries, Inc., Monrovia, Calif.

[21] Appl. No.: 09/290,347

[22] Filed: Apr. 12, 1999

Related U.S. Application Data

[60] Provisional application No. 60/081,749, Apr. 19, 1998.

[51] Int. Cl.[7] .............................. B64C 1/00; B64C 1/20; E05C 3/04

[52] U.S. Cl. ................... 244/129.1; 244/118.1; 292/202

[58] Field of Search .................. 244/118.1, 121, 244/129.1; 74/526, 527, 543; 292/194, 202

[56] References Cited

U.S. PATENT DOCUMENTS

| | | | |
|---|---|---|---|
| 5,156,359 | 10/1992 | Noble et al. | 244/129.4 |
| 5,741,032 | 4/1998 | Chaput | 292/202 |
| 5,887,916 | 9/1997 | Finkelstein et al. | 292/202 |

*Primary Examiner*—Peter M. Poon
*Assistant Examiner*—Charles R Ducker, Jr.
*Attorney, Agent, or Firm*—Christie, Parker & Hale, LLP

[57] ABSTRACT

A gallery retainer is provided having a axial bore through which is fitted a bushing. The bushing has radial slots which interface with a detent mechanism formed in an angular bore drilled through the axial bore wall from a rear face of the retainer. A rotation limiting mechanism is formed near the front face of the retainer in the bore. The retainer provides for maximization of material thickness at the retainer critical load bearing areas while reducing the overall material volume.

25 Claims, 3 Drawing Sheets

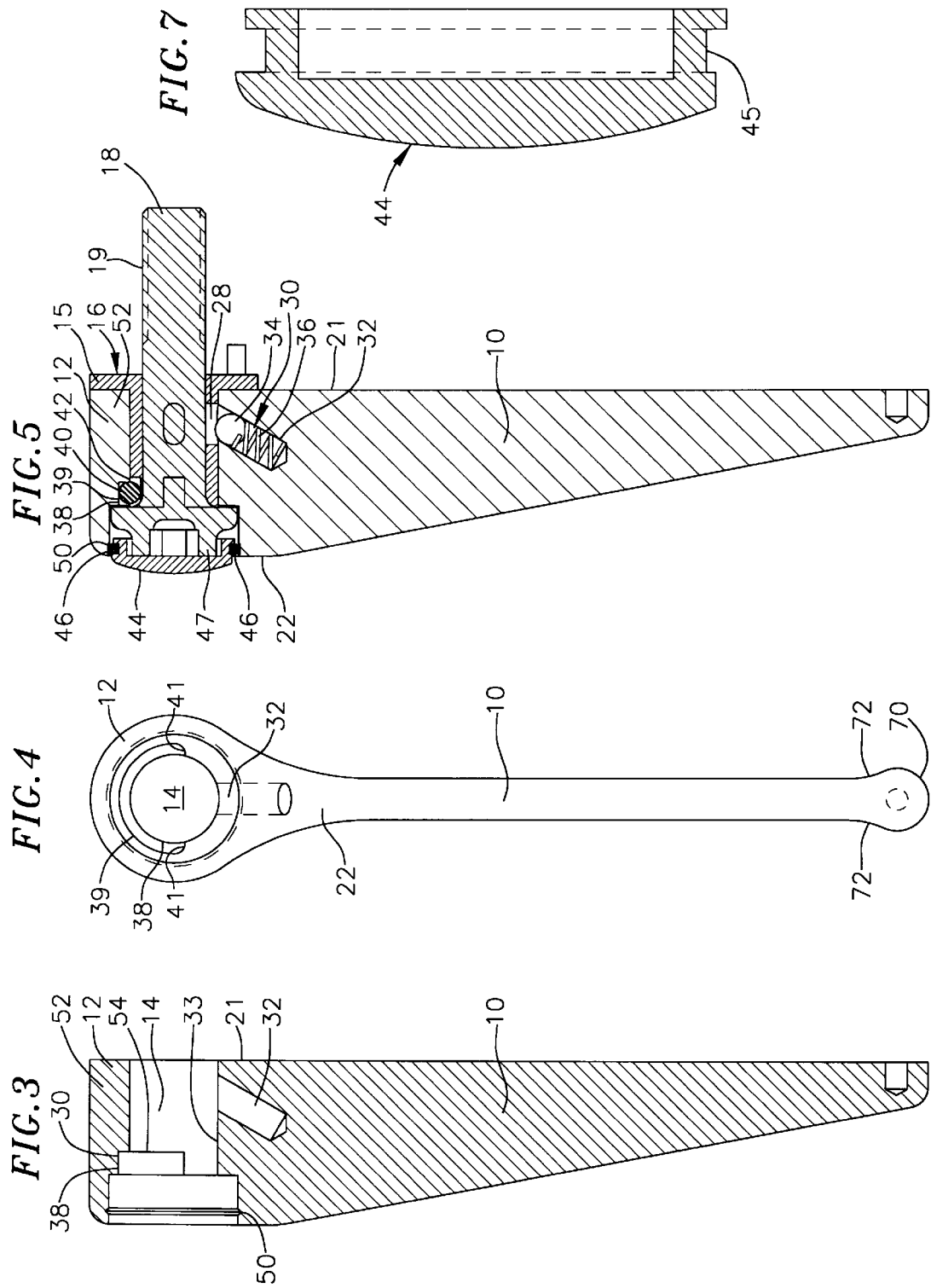

GALLERY RETAINER

CROSS REFERENCE TO RELATED APPLICATION

This application claimed priority and is based on Provisional Application No. 60/081,749; filed on Apr. 14, 1998.

BACKGROUND OF THE INVENTION

Galley retainers, also known as one-quarter turn retainers are currently used in aircraft interiors, usually within galley structures, to position and retain moveable items. The moveable items may include galley doors, drawers, work tables, utility carts and trays. Typically, the retainer is rotated from a locking position blocking the path and thus the movement of the moveable item to a position not interfering with such path. With the retainers in an unlocked positioned, items can be removed from or inserted into their respective, safety positions. With the retainers in the locked position, the items are held in a safety position to prevent undesired movement. Typically galley retainers consist of a body from which extends an arm.

Currently available galley retainers do not fully consider the minimization of mass and weight, and the maximization of strength, ergonomics and styling for their intended application. As a result, many retainers are prone to premature failures. To account for such failures, and because of the design of the currently available galley retainer componentry, more mass and proportional weight is added to the retainers to withstand the required stress loads. As a result, such retainers have increased weight. This additional weight is undesirable in an aircraft which may have over 80 retainers.

A further drawback with currently available galley retainers is that they are more difficult and expensive to manufacture and assemble due to their more complicated design.

Consequently, a galley retainer is needed to address the problems associated with currently available retainers. Thus, a galley retainers is desired that is able to withstand operational loads, be ergonomically functional, have reduced weight and be easier and less expensive to manufacture.

SUMMARY OF THE INVENTION

A gallery retainer is provided having a body and an arm integrally extending from the body. A bore is formed axially through the body. A bushing is inserted into the bore. A detent mechanism is formed by drilling an angular bore through a surface of the axial bore from the rear face of the retainer, i.e., the surface of the retainer facing the moveable item to be retained when the retainer is installed in a gallery. A spring and ball bearing all fitted in the angular bore forming the detent mechanism. The detent mechanism allows the retainer to rotate relative to the bushing to various desired positions at which the detent mechanism engages slots formed on the bushing. A rotation limiting mechanism is formed in the axial bore near the front face of the retainer. The rotation limiting mechanism includes an arcuate groove formed on the inner surface of the bore near the front face of the retainer. In this regard, the thickness of the bore upper wall near the rear face of the retainer which is the load bearing portion of the wall is kept to a maximum so as to minimize cracking or failure of such wall. The rotation limiting mechanism comprises a ball bearing seated in the groove formed on an end of the bushing and riding in the arcuate groove formed in the axial bore. The end of the bushing where the rotation limiting mechanism is formed may be swaged to retain the bushing and ball bearings in place.

DESCRIPTION OF THE DRAWINGS

FIG. 3 is a cross-sectional view of the retainer body with integrally extending arm of the retainer of the present invention.

FIG. 4 is a front view of the retainer body with integrally extending arm shown in FIG. 3.

FIG. 5 is a cross-sectional view of a retainer whose body and arm are shown in FIG. 3.

FIG. 7 is a cross-sectional view of the cap used in the retainer shown in FIG. 5.

DETAILED DESCRIPTION

Figure 1:
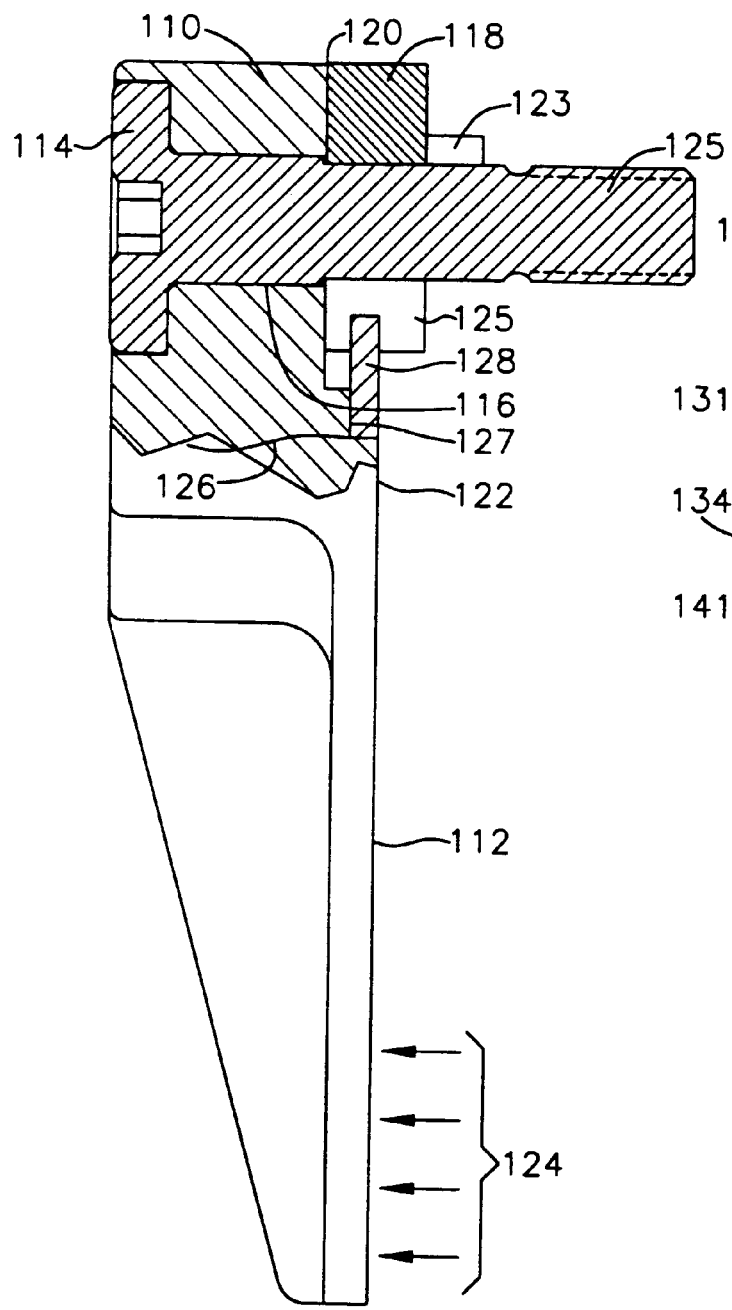
FIG. 1 depicts a partial cross-sectional view of a prior art retainer.

A typical galley retainer shown in FIG. 1 consists of body 110 and arm 112. A stud 114 is fitted through an opening 116 in the body of the retainer. The stud penetrates a rotating cam 118 fitted in a machined out section 120 on the a rear face 122 of the retainer. The rear face of the retainer is the surface of the retainer which faces the moveable object being retained when the retainer is installed in a galley. Two pins 123, only one of which is shown in FIG. 1, extend outwardly from the cam in a direction away from the retainer rear face. To install the retainer, the stud portion 125 protruding beyond the retainer rear face is threaded to a threaded hole in the galley and the pins are simultaneously inserted in other holes in the galley. When in a locking position, the retainer arm serves to block and thus prevent the movement of movable objects toward the arm. Consequently, impact forces are imparted on the rear face of the arm by the moveable object as shown by arrows 124. These impact forces are substantial. They can often exceed 2300 lbs. Because a portion of the body is machined out to receive the cam, it is weakened. Consequently, cracks 126 form at the weakened body as the impact forces acting on the retainer arm attempt to bend the arm.

To limit the rotational travel of the cam and thus, of the retainer, an arcuate portion of the cam is cutout defining two edge walls 125, only one of which is shown in FIG. 1, at either end of the cutout. In addition, a groove 127 is formed on the back surface of the arm. A stop member 128 is fitted into the groove and extends into the arcuate cutout on of the cam. The groove is swaged to hold the stop in place. Cam rotation is stopped when the cam edge walls 125 engage the stop member 128.

Figure 2:
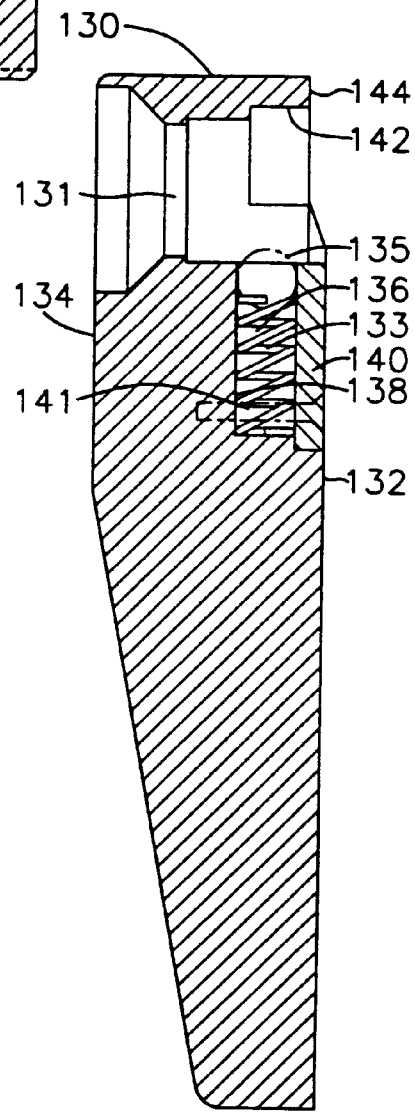
FIG. 2 depicts a cross-sectional view of the body with integrally extending arm of another prior art retainer.

In another type of galley retainer whose body and arm are shown in cross-section in FIG. 2, an axial bore 131 is formed in the body 130 of the retainer extending from the rear face 132 to the front face 134 of the body to accommodate a bushing (not shown) which accommodates a shaft (not shown). A detent mechanism is housed in a chamber 136. The chamber is formed by a two step process at the rear face of the retainer. First a groove 138 is machined from the rear face of the retainer arm. A spring 133 is placed in the groove on top of which is fitted a detent ball 135. Second, the groove is covered by a plate 140 which is fastened to the retainer arm with a fastener 141.

An upper portion 142 of the bore near the rear face is machined to a radius larger than the radius of the bore forming an arcuate path for accommodating a rotation limiting mechanism. Consequently, thickness of the upper portion 144 of the bore wall is thinned out. When the impact loads are acting on the arm, the shaft and bearing react these impact loads on the upper portion of the bore at the rear face of the retainer. Consequently, cracks form at the thinned upper portion 144 of the wall of the bore eventually resulting in the tearing of the upper portion of the wall and the failure of the retainer.

As can be seen both of the exemplary current retainers are prone to failure due to their design. Another problem with current retainers is that is that the bushing or cam is not fixed in a transverse direction relative to the retainer. Thus during installation care must be taken to ensure that the cam or bushing is not separated from the retainer which may result in the loss of the ball bearings and other componentry. This make makes the installation process more difficult. Moreover, the exemplary current retainers require excessive manufacturing steps.

A retainer of the present invention comprises an elongated retainer arm portion 10 which is integral and extends from body portion 12 (FIGS. 3, 4 and 5). An axial bore 14 is formed in the body for receiving a bushing (or cam) 16 and a stud 18 (FIG. 5). The arm and body are preferably formed from a single piece of material.

Figure 6A:
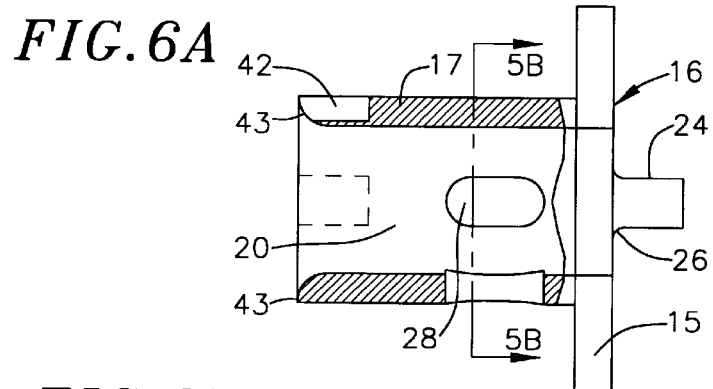
FIG. 6A is a partial cross-sectional side view of the bushing incorporated in the retainer shown in FIG. 5.
Figure 6B:
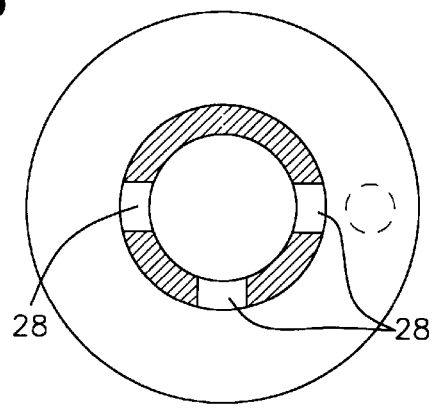
FIG. 6B is a cross-sectional view through the slots of the bushing shown in FIG. 6A.

The bushing comprises a first section 15 having a diameter larger than the diameter of the axial bore and a second section 17 having diameter slightly smaller than the diameter of the axial bore (FIG. 6A). The bushing second end is inserted into the axial bore from the rear face 21 of the retainer (FIG. 4). The first section remains external to the axial bore. The bushing contains a central bore 20. Once the bushing is mounted in the axial bore 14 in the body, the stud 18 is fitted through the bushing bore 20 from the retainer front face 22 and extends beyond the rear face 21 of the retainer (FIG. 5). The stud end portion 19 extending beyond the rear face of the retainer is threaded for threading into a threaded opening formed on a galley surface during retainer to galley installation. The bushing has one or two machined in place, anti-rotation pins 24 (FIGS. 6A and 6D). Each pin fits into a hole located in the galley surface to prevent the bushing from rotating with respect to the galley surface. Each anti-rotation pin includes a sufficient corner radius 26 that reduces the possibility of shearing or bending in normal service. The bushing further includes a plurality of slots 28 positioned radially around the circumference of the bushing which cooperate with a ball detent 30 located within an angled bore 32 formed through the axial bore (FIGS. 3, 5, 6A and 6B). The ball detent comprises a ball bearing 34 and a spring 36 positioned within the angled bore 32 which urges the ball towards the bushing as shown in FIG. 5. The slots 28 in the bushing allow the retainer to be rotated to various desired positions where the ball bearing engages the slots. Each slot defines a desired position. One or multiple slots may be formed depending on the number desired positions. For example, if two positions are desired, then only two slots need to be formed on the bushing. The relative spacing of the slots is defined by the amount of rotation desired between each position. Instead of slots other openings may be formed radially around the circumference of the bushing. Slots or other types of openings are preferred over grooves because they provide for a more positive engagement with the ball because a portion of the ball is able to penetrate entirely the slot or opening.

The angled bore 32 is formed by drilling through the axial bore lower wall 33 from the rear face 21 of the retainer. Some current retainers, as for example the retainer shown in FIG. 2, have a detent mechanism housed in a chamber formed by machining a groove machined through the rear face of the retainer, covering the groove with a plate and then fastening the plate to the retainer using a fastener. By forming an angled bore by angularly drilling through the horizontal bore, the present invention retainer allows for a reduction in the retainer weight by not requiring additional parts, namely the cover and fastener, and also simplifies assembly by not requiring the additional steps of forming a cover and then fastening the cover to the retainer.

The retainer of the present invention also incorporates a rotation limiting mechanism. The rotation limiting mechanism comprises an arcuate groove 38 formed in the retainer body at an upper portion of the axial bore 14 near the front face 22 of the retainer (FIGS. 3, 4 and 5). The mechanism also includes a ball bearing 40 seated within a groove 42 formed in the end of the bushing 16 (FIGS. 5, 6A, 6C and 6D). The ball bearing 40 rides in the arcuate groove 36. The upper wall 39 of the arcuate groove 38 retains the ball bearing 40 within the groove 42 preventing the ball bearing from unseating from the groove 42. As the bushing is rotated relative to the body, the ball bearing 40 travels along the arcuate groove. Rotation is limited, i.e., stopped, by the end walls 41 of the arcuate groove which stop the travel of the ball bearing and thus the relative rotational travel between the bushing and body (FIG. 4).

Figure 6C:
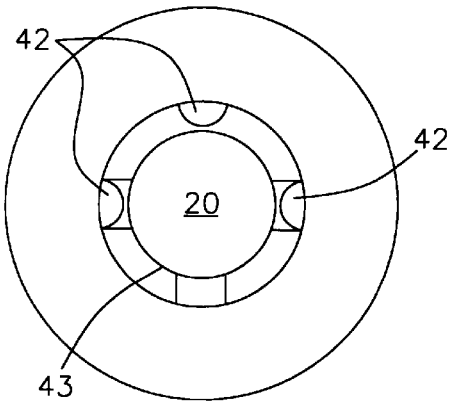
FIG. 6C is a front view of the bushing shown in FIG. 6A.
Figure 6D:
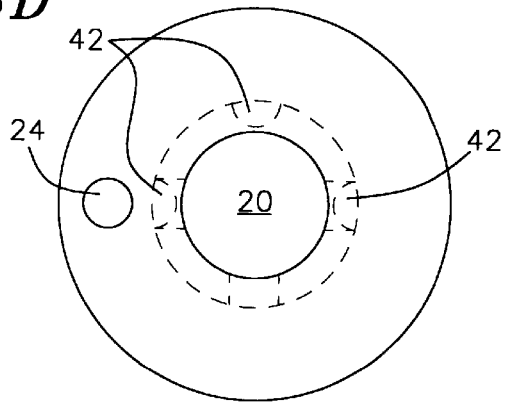
FIG. 6D is an end view of the bushing shown in FIG.6A.

One or multiple grooves 42 may be formed radially around and at the end of the bushing (FIG. 6C). In this regard, the stops provide by the rotation limiting mechanism can be changed by seating the ball bearing 40 in a different groove 42. In alternate embodiments, the arcuate groove may be formed at any other location around the axial bore 14 near the retainer front face. By forming the rotation limiter arcuate groove 38 nearer the front face of the retainer, the thickness of the load bearing bore wall 52 near the rear face of the retainer is kept to a maximum increasing the wall's resistance to crack growth and failure (FIGS. 3 and 5).

Once the ball bearing 40 is seated in the groove 42 within the arcuate groove 36, the end 43 of the bushing is preferably swaged for retaining the ball bearing 40 within the slot 42 and arcuate groove 36, and thereby retaining the bushing within the axial bore. In this regard, the bushing and ball bearings, i.e., the detent mechanism ball bearing 34 and the rotation limiting mechanism ball bearing 40, are securely retained by the retainer components, thereby simplifying the installation process of the retainer to the galley, as well as eliminating the possibility of accidental disassembly of the ball detent, bushing and rotation limiter.

An optional cap 44 having an O-ring 46 around its perimeter can be positioned in the end of the axial bore at the front face 22 of the retainer body to cover the end face 47 of the pin to minimize the trapping of dirt and other contaminants within the axial bore (FIGS. 5 and 7). To accommodate the O-ring, the cap is formed with a circumferential groove 45 as shown in FIG. 7. A circumferential groove 50 may be formed on the axial bore inner surface near the front face of the retainer to accommodate the O-ring. In this regard, when the cap is in position covering the axial bore, a portion of the O-ring is seated in the circumferential groove 45 of the cap and a portion is seated in the circumferential groove 50 in the axial bore interlocking the cap to the retainer.

The tip 70 of arm 10 of the retainer is wider than the arm and is rounded to reduce the risk of injury to the operator of the retainer or to aircraft passengers (FIG. 4). The tip circumference spans, about two thirds of a circle. Moreover, the arm and tip intersection is defined by smooth radii 72.

Although the present invention has been described and illustrated to respect to multiple embodiments thereof, it is to be understood that it is not to be so limited, since changes and modifications may be made therein which are within the full intended scope of this invention as hereinafter claimed.

We claim:

1. A galley retainer for restraining a moveable object, the retainer comprising:
    a body having a rear face for facing toward the moveable object and a front face;
    an arm extending from the body;
    a bore formed through the body extending between the front and rear faces;
    a hole formed through the bore extending diagonally into the body;
    a spring fitted in the hole;
    a first ball seated on top of the spring;
    an arcuate path formed at a portion of the bore nearer the front face of the body;
    a bushing fitted in the bore from the rear face of the retainer, wherein the body can rotate relative to the bushing, the bushing comprising,
        a first larger diameter portion having an outer diameter not smaller than the diameter of the bore, the first portion having an opening, wherein the first portion is external of the bore,
        a second smaller diameter cylindrical portion extending from the first portion, the second portion having a thickness, a central opening, and an outside diameter smaller than the inside diameter of the bore, wherein the second portion extends to the arcuate path formed in the body, and wherein the central opening of the second portion is aligned with the opening through the first portion defining a bushing bore,
        at least one opening formed through the thickness of the second portion outer surface for engaging the first ball,
    at least one groove formed on the second portion outer surface at a location distal from the first larger diameter portion, and
    a second ball seated at the groove and extending into the arcuate path; and
    a stud fitted through the bushing bore from the second diameter section and extending beyond the first diameter section.

2. A retainer as recited in claim 1 wherein the at least one opening is a slot penetrating through the thickness of the second cylindrical portion.

3. A retainer as recited in claim 2 comprising a plurality of slots radially and equidistantly oriented around the second cylindrical portion for engaging the first ball.

4. A retainer as recited in claim 1 wherein the end of the cylindrical second portion of the bushing distal of the first portion is swaged for retaining the bearing in the body bore.

5. A retainer as recited in claim 1 further comprising a cover covering the body bore at the front face of the body.

6. A retainer as recited in claim 5 further comprising:
    a circumferential groove formed around the body bore near the front face of the retainer;
    a circumferential groove formed around cap; and
    a seal seated in the circumferential groove of the cap and seated in the circumferential groove formed in the body bore.

7. A retainer as recited in claim 1 further comprising a pin extending axially from the first portion of the bushing in a direction away from the second portion of the bushing.

8. A retainer as recited in claim 1 wherein the arcuate path is formed at an upper portion of the axial bore nearer the front face of the body.

9. A retainer as recited in claim 1 wherein the arm comprises a rounded tip portion having a diameter longer than the width of the arm measured across a front face of the arm at a location adjacent to the tip portion.

10. A galley retainer for restraining a moveable object, the retainer comprising:
    a body having a rear face for facing toward the moveable object, a front face, and a bore extending from the front to the rear face, wherein the body has an upper wall wherein the thickness of the upper wall is maximum at the rear face;
    an arm extending from a lower portion of the body;
    a hole formed through the bore extending diagonally into the body toward the arm;
    a spring fitted in the hole;
    a first ball seated on top of the spring;
    a bushing fitted in the bore from the rear face of the retainer wherein the body can rotate relative to the bushing, the bushing comprising,
        a first larger diameter portion having a diameter not smaller than the diameter of the bore and having an opening, the first portion remaining external of the bore on the rear face side of the retainer;
        a second smaller diameter cylindrical portion having an opening and a thickness extending from the first portion, the second portion having an outside diameter smaller than the inside diameter of the bore, wherein the second portion extends to an arcuate path formed in the body, and wherein the opening of the second portion is aligned with the opening through the first portion defining a bushing bore; and
        at least one depression formed on the second portion through its thickness for engaging the ball; and
    a stud fitted through the bushing bore from the second diameter section and extending beyond the first diameter section.

11. A retainer as recited in claim 10 wherein the depression is a slot.

12. A retainer as recited in claim 10 further comprising:
    an arcuate path machined from a portion of the body bore nearer the front face of the body;
    at least one groove formed on the bushing second portion outer surface at a location distal from the first larger diameter portion; and
    a second ball seated on the groove and extending into the arcuate path.

13. A retainer as recited in claim 12 wherein the arcuate path is formed at an upper portion of the body bore nearer the front face of the body.

14. A retainer as recited in claim 10 wherein the end of the cylindrical second portion of the bushing distal of the first section is swaged for retaining the bearing in the body bore.

15. A retainer as recited in claim 10 further comprising a cover covering the body bore from the front face of the body.

16. A retainer as recited in claim 15 further comprising:
    a circumferential groove formed around the body bore near the front face of the retainer;
    a circumferential groove formed around on the cap; and
    a circumferential seal seated on the circumferential groove formed in the cap, and seated in the circumferential groove formed in the bore.

17. A retainer as recited in claim 10 further comprising a pin extending axially from the first portion of the bushing in a direction away from the second portion of the bushing.

18. A retainer as recited in claim 10 wherein the arm comprises a rounded tip portion having a diameter longer than the width of the arm measured across a front face of the arm at a location adjacent to the tip portion.

19. A galley retainer for restraining movable objects, the retainer comprising:

a body having a rear face for engaging and restraining a moveable object, a front face and a bore extending from the front face to the rear face, wherein the body has an upper wall wherein the thickness of the upper wall is maximum at the rear face;

an arm extending from a lower portion of the body;

a bushing having a bore and fitted into the body bore, wherein the body can rotate relative to the bushing;

a detent maechanism fitted into a hole extending diagonally from an inner surface of the bore into the body, for engaging the bushing to the body at predetermined locations; and a stud fitted through the bushing bore from the front face of the retainer and extending beyond the rear face of the retainer.

20. A retainer as recited in claim 19 wherein the body has an upper wall wherein the thickness of the upper wall is maximum at the rear face.

21. A retainer as recited in claim 19 further comprising rotation limiting means within the horizontal bore for limiting the amount of rotation of the body relative to the bushing.

22. A retainer as recited in claim 21 wherein the rotation limiting means is located nearer the front face of the retainer.

23. A retainer as recited in claim 19 wherein the bushing is axially fixed relative to the body.

24. A retainer as recited in claim 19 further comprising a cover covering the body bore from the front face of the body.

25. A retainer as recited in claim 19 wherein the arm comprises a rounded tip portion having a diameter longer than the width of the arm measured across a front face of the arm at a location adjacent to the tip portion.

* * * * *

UNITED STATES PATENT AND TRADEMARK OFFICE
CERTIFICATE OF CORRECTION

PATENT NO.   : 6,010,094
DATED        : January 4, 2000
INVENTOR(S)  : Terrence S. Csik; Dale L. Short It is certified that error appears in the above-identified patent and that said Letters Patent is hereby corrected as shown below:

Column 7,
Lines 12-14, after "to the rear face" delete ", wherein the body has an upper wall wherein the thickness of the upper wall is maximum at the rear face".

Signed and Sealed this

Twentieth Day of November, 2001

*Attest:*

*Attesting Officer*

NICHOLAS P. GODICI
*Acting Director of the United States Patent and Trademark Office*